United States Patent [19]

Pardee

[11] Patent Number: 4,496,922
[45] Date of Patent: Jan. 29, 1985

[54] ELECTROMAGNETICALLY RELEASED COUPLING

[75] Inventor: James A. Pardee, Janesville, Wis.

[73] Assignee: Warner Electric Brake & Clutch Company, South Beloit, Ill.

[21] Appl. No.: 557,872

[22] Filed: Dec. 5, 1983

[51] Int. Cl.³ .............................................. H01F 7/08
[52] U.S. Cl. .............................. 335/281; 192/84 PM; 192/84 T; 188/164
[58] Field of Search .............. 335/281, 296, 297, 229, 335/230; 188/161, 164; 192/84 A, 84 PM, 84 T

[56] References Cited

U.S. PATENT DOCUMENTS

| | | | |
|---|---|---|---|
| 2,738,449 | 3/1956 | Mason | 317/171 |
| 2,765,878 | 10/1956 | Pierce | 188/164 |
| 2,765,891 | 10/1956 | Pierce | 192/84 |
| 2,823,776 | 2/1958 | Pierce | 192/18 |
| 2,832,918 | 4/1958 | Pierce | 317/123 |
| 2,914,714 | 11/1959 | Pierce et al. | 317/201 |
| 2,956,658 | 10/1960 | Jaeschke | 192/84 |
| 2,962,144 | 11/1960 | Heinemann et al. | 192/84 PM |
| 3,055,470 | 9/1962 | Pierce | 192/21.5 |
| 3,199,645 | 10/1965 | Henning | 192/84 |
| 3,263,784 | 8/1966 | Pierce | 192/84 |
| 3,842,378 | 10/1974 | Pierce | 335/220 |

FOREIGN PATENT DOCUMENTS 154555 9/1982 Japan .................................. 188/161

Primary Examiner—George Harris
Attorney, Agent, or Firm—Leydig, Voit, Osann, Mayer & Holt, Ltd.

[57] ABSTRACT

A magnet assembly is made up by a plurality of magnet modules each having a permanent magnet adapted to attract a rotatable armature into engagement with the pole pieces of the module. Each module also includes an electromagnetic coil having an axis disposed perpendicular to the pole pieces. When energized, the coil produces flux which causes the permanent magnet flux to bypass the armature and enable release of the armature from the pole pieces.

8 Claims, 8 Drawing Figures

4,496,922

ELECTROMAGNETICALLY RELEASED COUPLING

BACKGROUND OF THE INVENTION

This invention relates to an electromagnetic coupling such as a clutch or brake. More particularly, the invention relates to an electromagnetic coupling in which the active magnetic force is produced by a permanent magnet but is rendered ineffective upon energization of an associated winding.

A coupling of the foregoing general type is disclosed in Pierce U.S. Pat. No. 2,832,918. In that coupling, a permanent magnet creates flux which threads a working path between an armature and the concentric pole pieces of an annular shell in order to magnetically draw the armature into frictional engagement with the shell. A winding is concentric with the pole pieces and, upon being energized, creates flux which threads through the permanent magnet along a bypass path which is in parallel with the working path. When the winding is energized, the winding flux shunts the permanent magnet flux from the working path to the bypass path so as to render the permanent magnet ineffective and effect release of the armature from the pole pieces.

SUMMARY OF THE INVENTION

The general aim of the present invention is to provide an electromagnetically released coupling which preferably works on the same general principle as the Pierce coupling but which is modular in nature so that separate modules of the same basic design may be grouped together in an optimum number and arrangement for different applications.

A further object of the invention is to provide an electromagnetically released coupling made up of several modules having individual windings whose response time is less than that of prior couplings of comparable torque capacity but having only a single winding.

Another object is to provide an electromagnetically released coupling having a wide release band which is effective over wide temperature ranges.

Still another object is to provide a coupling in which the armature is more effectively released from the pole pieces and has less tendency to hang up on either or both pole pieces when the winding is energized.

A more detailed object of the invention is to achieve the foregoing by providing an electromagnetically released coupling module in which the winding is uniquely positioned with its axis perpendicular to the pole pieces of the coupling.

These and other objects and advantages of the invention will become more apparent from the following detailed description when taken in conjunction with the accompanying drawings.

DETAILED DESCRIPTION OF THE PREFERRED EMBODIMENT

DETAILED DESCRIPTION OF THE PREFERRED EMBODIMENTS

Figure 1:
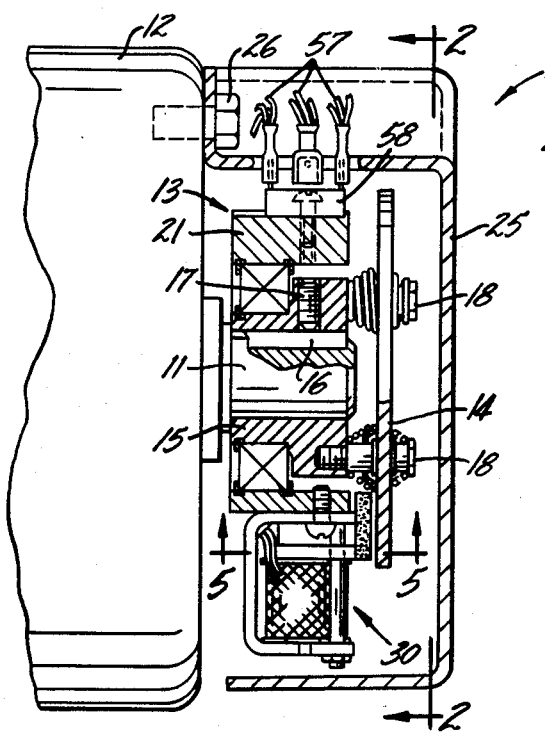
FIG. 1 is a cross-sectional view taken axially through a new and improved electromagnetic coupling incorporating the unique features of the present invention and showing the coupling in a typical installation.

As shown in the drawing for purposes of illustration, the invention is embodied in an electromagnetically released coupling 10 which herein is in the form of a brake for selectively retarding rotation of the shaft 11 of a motor 12. In general, the brake 10 comprises a fixed magnet assembly 13 and a rotatable armature 14 adapted to be shifted axially into and out of frictional engagement with the magnet assembly. Frictional engagement of the armature with the magnet assembly acts to retard rotation of the shaft 11. The armature herein is circular in shape and is made of magnetic material.

A hub 15 (FIG. 1) is telescoped over one end portion of the shaft 11 and is secured thereto by a key 16 and two set screws 17, only one of the set screws being shown. The armature 14 is spaced axially from the outboard end of the hub and is mounted to slide axially on a set of three angularly spaced pins 18 which are threaded into the end of the hub. Telescoped over each pin is a coil spring 19 (FIG. 3) which urges the armature away from the magnet assembly 13, the spring being compressed between the end of the hub and the inboard face of the armature. Another coil spring 20 is telescoped over the pin and is compressed between the outboard face of the armature and a head on the pin. The springs 20 urge the armature in toward the magnet assembly but with a smaller biasing force than the springs 19 so that the net effect of the springs 19 and 20 is to urge the armature out to a released position. The arrangement which has been described and illustrated automatically compensates for wear in the manner disclosed in Kroeger U.S. Pat. No. 3,624,767.

Figure 2:
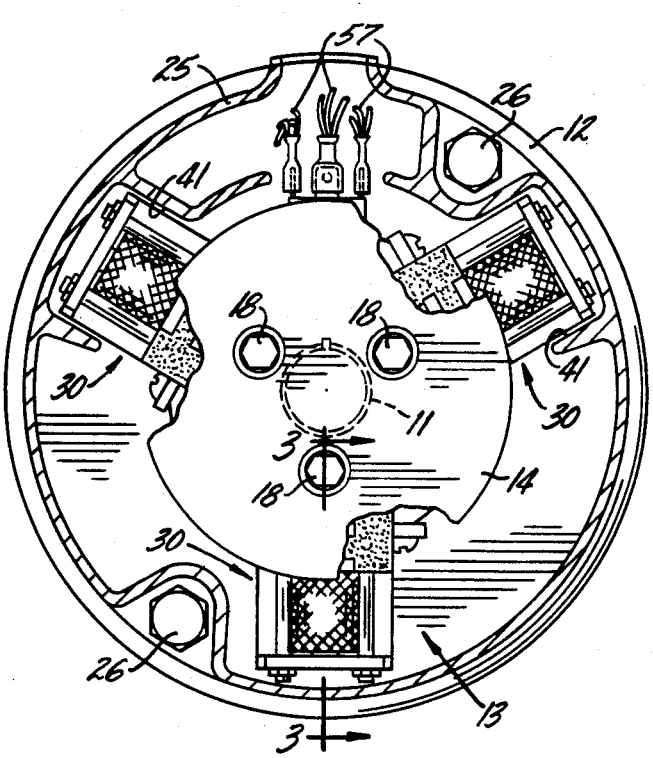
FIG. 2 is a fragmentary cross-section taken substantially along the line 2—2 of FIG. 1.

The magnet assembly 13 includes a mounting ring 21 which encircles the hub 15 and which is mounted on the hub by a bearing 22 permitting the hub to rotate relative to the mounting ring. A dish-shaped end bell 25 (FIG. 1) is fastened to the motor 12 by screws 26 (FIG. 2) and encloses the magnet assembly 13 and the armature 14.

In accordance with the present invention, the magnet assembly 13 is made up of a plurality of identical magnet modules 30 of unique construction. Each magnet module includes a permanent magnet 31 (FIG. 3) for drawing the armature 14 to its braking position and further includes a selectively energizable electromagnetic annular coil 32 for rendering the permanent magnet ineffective so as to enable the armature to move to its released position. The invention is particularly characterized by the novel positioning of the permanent magnet and the electromagnetic coil to enable the two to form an effective magnet module.

In this particular instance, three magnet modules 30 are spaced equally around the mounting ring 21. The three modules are identical and thus a description of one will suffice for all.

Figure 3:
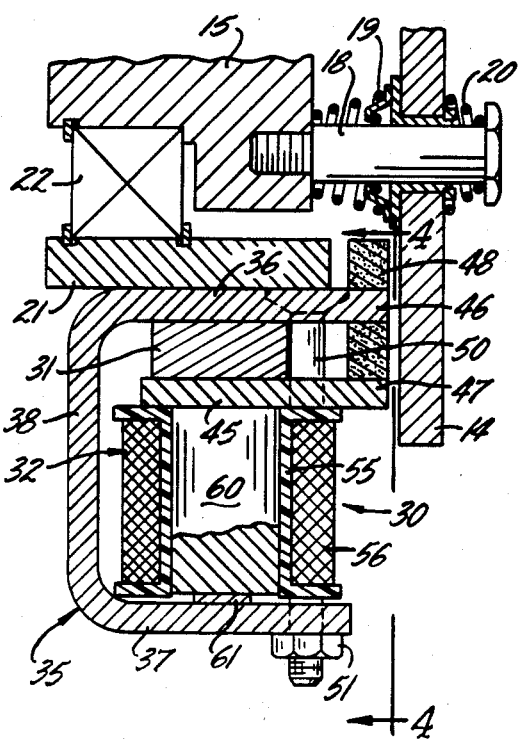
FIG. 3 is an enlarged fragmentary cross-section taken substantially along the line 3—3 of FIG. 2.
Figure 4:
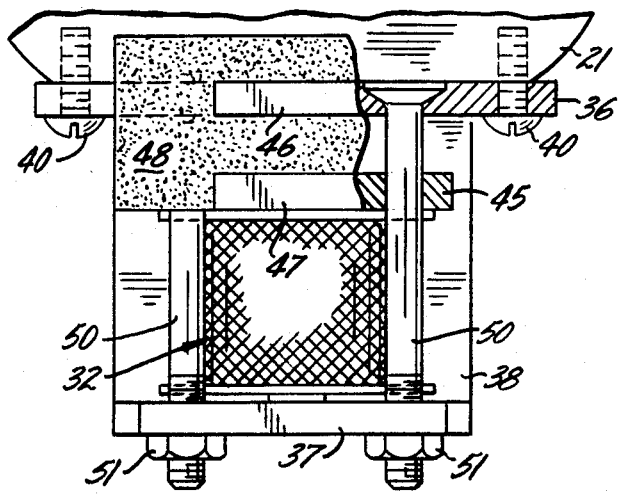
FIG. 4 is a fragmentary cross-section taken substantially along the line 4—4 of FIG. 3.
Figure 5:
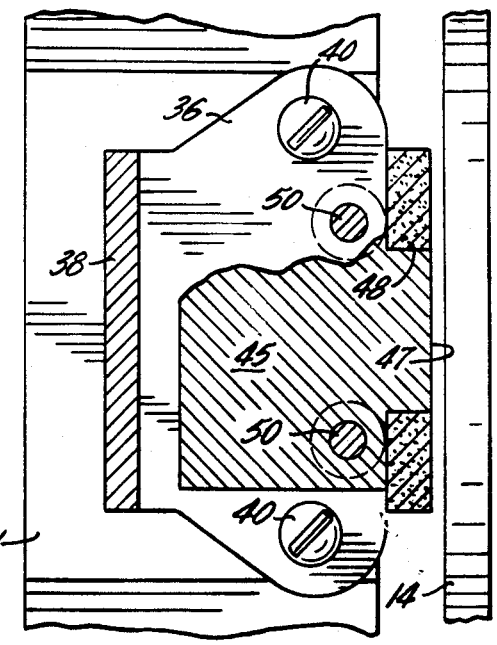
FIG. 5 is an enlarged fragmentary cross-section taken substantially along the line 5—5 of FIG. 1.

As shown in FIG. 3, each magnet module 30 comprises a generally U-shaped pole piece 35 having an axially extending inner leg 36, an axially extending outer leg 37 disposed parallel to the inner leg, and a radially extending leg 38 spanning the inboard ends of the axially extending legs. The U-shaped pole piece 35 is made from a single piece of magnetic material and preferably is formed such that all three of the legs 36, 37 and 38 are flat and planar. Two screws 40 (FIG. 4) extend through the inner leg 36 and are threaded into the ring 21 to secure the U-shaped pole piece to the ring. In addition, the U-shaped pole pieces of two of the magnet modules 30 fit within pockets 41 (FIG. 2) formed in the inside of the end bell 25. The pockets captivate the U-shaped pole pieces against rotation and thus serve to hold the three modules 30 and the mounting ring 21 in a rotationally stationary position.

Each magnet module further comprises a second pole piece 45 (FIG. 3) which herein is in the form of a flat and planar plate made of magnetic material. The pole piece 45 is located between and extends parallel to the legs 36 and 37 of the U-shaped pole piece 35 and is positioned nearer to the inner leg 36 than to the outer leg 37. The outboard ends of the leg 36 and the pole piece 45 are disposed in a radially extending plane and define pole faces 46 and 47, respectively. A rectangular piece of friction material 48 such as brake lining is bonded to the outboard end portions of the leg 36 and the pole piece 45 and is formed with openings which receive the same so that the pole faces 46 and 47 are located flush with the outboard side of the friction material (see FIG. 3).

The permanent magnet 31 (FIG. 3) of each magnet module 30 is sandwiched tightly between the leg 36 and the pole piece 45 with one of its poles (e.g., the "north" pole) contacting the leg 36 and with its other pole contacting the pole piece 45. Two bolts 50 (FIG. 4) extend through the leg 36, the pole piece 45 and the leg 37 to hold these components together and to tightly clamp the magnet in place between the leg 36 and the pole piece 45, there being nuts 51 on the ends of the bolts.

As mentioned above, each magnet module 30 includes an annular electromagnetic coil 32. In carrying out the invention, the coil is disposed with its axis disposed perpendicular to the leg 36 and the pole piece 45 and, as shown, preferably is disposed between the leg 37 and the pole piece 45. The coil includes an annular bobbin 55 (FIG. 3) upon which is wound a multiple-turn winding 56. The bobbin is clamped between the leg 37 and the pole piece 45 by the bolts 50 while the winding 56 includes lead wires 57 (FIG. 1) connected to a terminal block 58 on the mounting ring 21. The terminal block is adapted to be connected to a dc. voltage source for selectively energizing the winding 56.

Further in carrying out the invention, a core 60 (FIG. 3) made of magnetic material extends through the center of the coil 32 and is disposed perpendicular to the pole piece 45 and to the pole piece defined by the leg 36. The core herein is in the form of a short cylindrical rod which is separated from the leg 37 by an area of high magnetic reluctance. While such an area could simply be an air gap, it herein is defined by a thin brass shim 61 sandwiched between the leg 37 and the core 60 and cemented to the end of the core. The bolts 50 clamp the core and the shim between the leg 37 and the pole piece 45. In the preferred embodiment, the axis of the core not only is perpendicular to the leg 37 and the pole piece 45 but also is parallel to a plane containing the pole faces 46 and 47. It should be appreciated, however, that the axis of the core could extend perpendicular to a plane containing the pole faces while still being perpendicular to the pole pieces.

Figure 6:
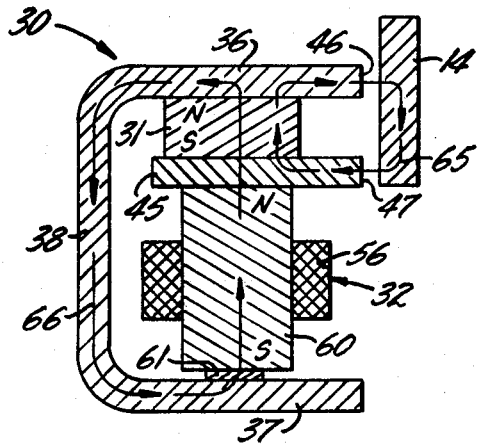
FIG. 6 is a schematic view of one of the magnet modules illustrated in FIG. 1 and schematically shows the flux paths.

FIG. 6 is a simplified diagram of one of the magnet modules 30. When the coil 32 is de-energized, most of the permanent magnet flux from the permanent magnet 31 threads a path 65 extending from the north pole of the permanent magnet, into the pole piece formed by the leg 36, out of the pole face 46 and into the armature 14, back out of the armature to the pole face 47 and thence through the pole piece 45 to the south pole of the magnet. Such flux attracts the armature 14 to the pole faces 46 and 47, overcomes the force of the springs 19 and draws the armature into frictional engagement with the pole faces and the friction material 48 to apply a braking action to the shaft 11. The high reluctance shim 61 restricts the permanent magnet flux from threading through the core 60 to the leg 37.

The winding 56 is polarized (i.e., wound in the appropriate direction and energized by direct current flow of the appropriate polarity) such that, when excited, the winding produces flux which threads through the permanent magnet 31 in the same direction as the permanent magnet flux and along a path 66 (FIG. 6). Specifically, flux produced by the winding 56 threads out of one pole (e.g., the north pole) of the core 60 and through the pole piece 45, thence from the south pole to the north pole of the permanent magnet 31, through the legs 36, 38 and 37 and then across the shim 61 to the south pole of the core. Because of the winding flux threading the path 66, the reluctance of that path is reduced to a value lower than the reluctance of the path 65. As a result, the flux created by the permanent magnet 31 is shunted through the path 66 and effectively bypasses the path 65 so as to enable the springs 19 to force the armature 14 out of engagement with the friction material 48 and thereby release the braking action. Thus, the permanent magnet flux 65 holds the armature in engagement with the friction material as long as the winding 56 is de-energized but is rendered ineffective and effectively bypasses the armature upon energization of the winding. Because the winding flux 66 threads through the permanent magnet in the same direction as the permanent magnet flux 65, the winding flux tends to re-magnetize the permanent magnet rather than to de-magnetize the same.

The foregoing arrangement provides several advantages. First, the magnet modules 30 all are of identical design. Any number of modules may be used in the magnet assembly 13 to meet the braking torque requirements of a given application. The very same modules may be used to make up magnet assemblies of different diameters and thus it is not necessary to provide an entirely different magnet assembly for each different diametral application.

In addition, the inductance of several magnet modules 30 connected in parallel is small when compared to the inductance of a magnet assembly of the same torque capacity as the present assembly 13 but having only a single winding. Because of the relatively low inductance, the time required for current to build up and decay in the windings is comparatively short and thus the overall response time is decreased. A magnet module 30 in accordance with the invention may be easily designed to better accommodate manufacturing variations (e.g., high reluctance or air gap tolerances) and the module possesses a wide release band. That is to say, it has been found that a magnet module 30 in accordance with the present invention effects release of the armature 14 over a wide range of voltages applied to the winding 56 rather than effecting release when the voltage reaches one level and then effecting re-engagement when the voltage increases only slightly from that level. The wide release band enables the coupling 10 to function effectively under varying temperature conditions which tend to change the flux output of the permanent magnet 31 and the winding 56.

Figure 7:
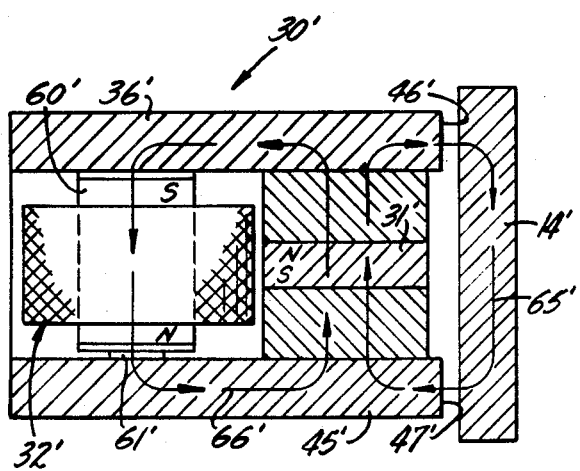
FIG. 7 is a schematic view similar to FIG. 6 but shows another embodiment of a magnet module.

It has been found that the magnet module 30 effects substantially simultaneous release of the armature 14 from both of the pole faces 46 and 47 and reduces the tendency of the armature to release from one pole face while still hanging up on the other pole face. Virtually perfect simultaneous release of the armature from both pole faces may be achieved by a magnet module 30' of the type shown in FIG. 7 where parts corresponding to those of the magnet module 30 of the first embodiment are indicated by the same but primed reference numerals.

The module 30' is essentially the same as the module 30 except that the coil 32', the core 60' and the shim 61' are located directly between the pole piece 45' and a parallel flat and planar pole piece 36'. In this instance, the permanent magnet 31' is located between the pole faces 46' and 47' and the coil 32'. Most of the permanent magnet flux normally threads a path 65' while flux produced by the coil threads a path 66' when the coil is energized. Upon energization of the coil, the reluctance of the path 66' is reduced and thus flux in the path 65' threads the path 66' and bypasses the armature 14'. The symmetrical positioning of the coil 32' relative to the pole faces 46' and 47' insures release of the armature from both pole faces at the same time. As a result, lighter release springs 19 may be used to enable the use of a less powerful permanent magnet and consequently the use of less magnetomotive force in the coil.

Figure 8:
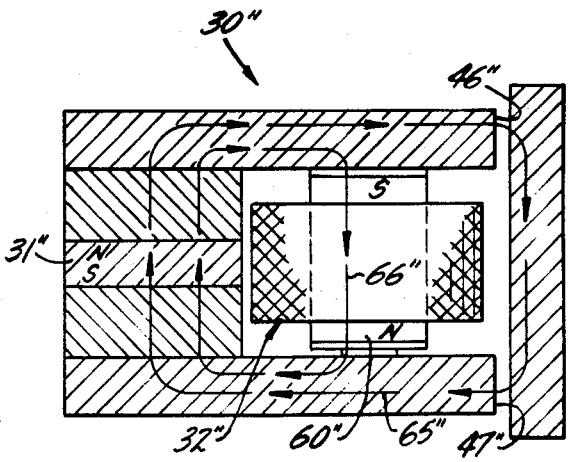
FIG. 8 is another schematic view similar to FIG. 6 but shows still another embodiment of a magnet module.

The module 30" shown in FIG. 8 is the same as the module 30' except the positions of the permanent magnet 31" and the coil 32" are reversed. Thus, the coil 32" is located between the pole faces 46" and 47" and the permanent magnet 31".

I claim:

1. An electromagnetic coupling comprising a pair of pole pieces spaced from one another and having pole faces, an armature rotatable relative to said pole pieces and mounted to move axially into and out of frictional engagement with said pole faces, a magnetized permanent magnet located between said pole pieces and polarized to create permanent magnet flux which threads through said magnet in one direction in a working path out of one of said pole faces, through said armature and into the other of said pole faces to attract said armature into engagement with said pole faces, and an annular winding adapted to be selectively energized by a voltage source, said electromagnetic coupling being characterized in that said winding is located between said pole pieces and has a central axis extending substantially perpendicular to said pole pieces, a core made of magnetic material and extending along said axis and through the center of said winding, said core being separated from said permanent magnet by an area of high reluctance and coacting with said pole pieces and said permanent magnet to create a path for winding flux which threads out of said core and into one of said pole pieces, through said permanent magnet and into the other of said pole pieces and then back to said core, said winding being polarized so as to cause said winding flux to flow through said permanent magnet in the same direction as said permanent magnet flux so as to shunt the latter flux from said working path and enable release of said armature from said pole faces when said winding is energized.

2. An electromagnetic coupling as defined in claim 1 in which one of said pole pieces comprises a flat and planar leg, the other of said pole pieces also having a substantially flat and planar leg spaced from the flat and planar leg of said one pole piece.

3. An electromagnetic coupling as defined in claim 2 in which the flat and planar legs of the two pole pieces extend substantially parallel to one another.

4. An electromagnetic coupling as defined in claim 3 in which said one pole piece includes a second flat and planar leg extending substantially parallel to the first flat and planar leg of such one pole piece, the flat and planar leg of the other pole piece being located between and being spaced from the first and second legs of said one pole piece, said permanent magnet being located between the first flat and planar leg of said one pole piece and the flat and planar leg of said other pole piece, and said winding and said core being located between the second flat and planar leg of said one pole piece and the flat and planar leg of said other pole piece.

5. An electromagnetic coupling as defined in claim 2 in which said permanent magnet, said winding and said core are located between the flat and planar legs of said pole pieces.

6. An electromagnetic coupling as defined in claim 5 in which said winding is located between said pole faces and said permanent magnet.

7. An electromagnetic coupling as defined in claim 5 in which said permanent magnet is located between said pole faces and said winding.

8. An electromagnetic coupling comprising a pair of pole pieces spaced from one another and having pole faces, an armature rotatable relative to said pole pieces and mounted to move axially into and out of frictional engagement with said pole faces, a magnetized permanent magnet associated with said pole pieces and polarized to create permanent magnet flux which threads through said magnet in one direction in a working path out of one of said pole faces, through said armature and into the other of said pole faces to attract said armature into engagement with said pole faces, and an annular winding adapted to be selectively energized by a voltage source, said electromagnetic coupling being characterized in that said winding has a central axis extending substantially perpendicular to said pole pieces, a core made of magnetic material and extending along said axis and through the center of said winding, said core coacting with said pole pieces to create a path for winding flux which threads out of said core, through said pole pieces and then back to said core, said winding flux path having a portion coextensive with a portion of said working path so as to cause said winding flux to render said permanent magnet flux ineffective in said working path and enable release of said armature from said pole faces when said winding is energized.

* * * * *